United States Patent
Yoshinori et al.

(10) Patent No.: US 10,734,866 B2
(45) Date of Patent: Aug. 4, 2020

(54) ROTATING ELECTRIC MACHINE

(71) Applicant: Mitsubishi Electric Corporation, Tokyo (JP)

(72) Inventors: Manabu Yoshinori, Tokyo (JP); Masaya Inoue, Tokyo (JP); Yoshiaki Kitta, Tokyo (JP); Shoya Mizokami, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 78 days.

(21) Appl. No.: 15/467,000

(22) Filed: Mar. 23, 2017

(65) Prior Publication Data

US 2018/0152078 A1    May 31, 2018

(30) Foreign Application Priority Data

Nov. 25, 2016    (JP) ................................. 2016-228534

(51) Int. Cl.
*H02K 9/19*        (2006.01)
*H02K 1/27*        (2006.01)
(Continued)

(52) U.S. Cl.
CPC ............. *H02K 9/19* (2013.01); *H02K 1/2706* (2013.01); *H02K 1/2766* (2013.01); *H02K 1/32* (2013.01);
(Continued)

(58) Field of Classification Search
CPC ............................... H02K 9/19; H02K 1/2706
(Continued)

(56) References Cited

U.S. PATENT DOCUMENTS 8,350,432 B2 * 1/2013 Guedes-Pinto .......... H02K 1/02
310/156.28
2007/0096577 A1 * 5/2007 Guven ................ H02K 1/2766
310/156.53
(Continued)

FOREIGN PATENT DOCUMENTS

CN        102832729 A     12/2012
JP      2000-312454 A     11/2000
(Continued)

OTHER PUBLICATIONS

Communication dated Sep. 26, 2017 from the Japanese Patent Office in counterpart Japanese application No. 2016-228534.
(Continued)

*Primary Examiner* — Terrence L Kenerly
(74) *Attorney, Agent, or Firm* — Sughrue Mion, PLLC; Richard C. Turner

(57) ABSTRACT

A rotating electric machine includes a rotor including a rotor core fixed to a shaft, respectively, an end plate provided between the rotor core and a front-side end plate for preventing scattering of a magnet, and an end plate formed in a bowl shape. A passage including a hole penetrating the rotor core and a hole connecting the shaft to the end plate and the bowl-shaped end plate is provided, liquid refrigerant is supplied through the passage, and the liquid refrigerant discharged from the passage is scattered by rotation along an inner peripheral surface of the bowl-shaped end plate so as to reach a space between a coil end surface of a stator and an end surface of an insulator supporting a coil of the stator.

10 Claims, 6 Drawing Sheets

(51) Int. Cl.
*H02K 1/32* (2006.01)
*H02K 55/02* (2006.01)
*H02K 5/02* (2006.01)
*H02K 5/20* (2006.01)

(52) U.S. Cl.
CPC .............. *H02K 5/02* (2013.01); *H02K 5/20* (2013.01); *H02K 55/02* (2013.01); *Y02E 40/622* (2013.01)

(58) Field of Classification Search
USPC .............................. 310/156.53, 156.56, 54
See application file for complete search history.

(56) References Cited

U.S. PATENT DOCUMENTS

2010/0019590 A1* 1/2010 Guedes-Pinto .......... H02K 1/02
310/53
2011/0309698 A1* 12/2011 Kirkley, Jr. .............. H02K 1/32
310/54
2013/0115064 A1* 5/2013 Kimura .................. H02K 3/522
415/177
2015/0137632 A1* 5/2015 Takahashi ................ H02K 1/28
310/54

FOREIGN PATENT DOCUMENTS

| JP | 2009-284603 | A | 12/2009 |
| JP | 2010-045894 | A | 2/2010 |
| JP | 2011-083139 | A | 4/2011 |
| JP | 5166566 | B2 | 3/2013 |
| JP | 2014-087123 | A | 5/2014 |
| JP | 2015-027119 | A | 2/2015 |

OTHER PUBLICATIONS

Communication dated May 31, 2019 from the China National Intellectual Property of Administration in counterpart Application No. 201710546771.4.

* cited by examiner

ROTATING ELECTRIC MACHINE

BACKGROUND OF THE INVENTION

1. Field of the Invention

The present invention relates to a rotating electric machine, and particularly relates to a cooling structure of a rotating electric machine.

2. Description of the Background Art

Conventionally, for example, a rotating electric machine has been known which has, as a cooling structure, a structure in which liquid refrigerant supplied to a shaft is guided to the outer peripheral side of an end plate and scattered to a stator coil end by rotation of a rotor (for example, see Japanese Laid-Open Patent Publication No. 2011-83139).

In addition, a rotating electric machine has been known which: has a structure in which liquid refrigerant supplied to a shaft is guided to the outer peripheral side of an end plate and scattered to a stator coil end by rotation of a rotor; and is provided with an opening at the inner radial side of an insulator to expose a coil therethrough (for example, see Japanese Patent No. 5166566).

In the conventional rotating electric machines described above, the liquid refrigerant scattered by rotation of the rotor collides with the insulator, so that the cooling efficiency for the coil is poor.

In addition, by providing an opening in the insulator and causing the liquid refrigerant to collide with the coil through the opening, the cooling efficiency can be improved. However, in order to ensure desired strength of the insulator in winding, it is necessary to increase the thickness of the insulator. As a result, a winding space for the coil decreases, so that the performance of the rotating electric machine diminishes.

SUMMARY OF THE INVENTION

The present invention has been made to solve the above-described problem, and it is an object of the present invention to provide a rotating electric machine that has improved cooling efficiency and has high performance.

A rotating electric machine according to the present invention includes: a housing; a rotor including a shaft rotatably supported within the housing, a rotor core in which a magnet is buried and which is fixed to the shaft, a front-side end plate and a rear-side end plate mounted at both ends of the rotor core, respectively, an end plate provided between the rotor core and the front-side end plate for preventing scattering of the magnet, and an end plate formed in a bowl shape; and a stator retained on an inner peripheral surface of the housing so as to face the rotor, wherein a passage including a hole penetrating the rotor core and a hole connecting the shaft to the end plate and the bowl-shaped end plate is provided, liquid refrigerant is supplied through the passage, and the liquid refrigerant discharged from the passage is scattered by rotation along an inner peripheral surface of the bowl-shaped end plate so as to reach a space between a coil end surface of the stator and an end surface of an insulator supporting a coil of the stator.

According to the present invention, the liquid refrigerant can be caused to directly collide with the stator coil end, so that the cooling effect can be enhanced. In addition, the liquid refrigerant can be supplied to the stator coil so as to avoid the insulator, so that it is not necessary to increase the thickness of the insulator. Thus, the performance of the rotating electric machine can be enhanced.

The foregoing and other objects, features, and advantageous effects of the present invention will become more apparent from detailed description in the following embodiments and description in the accompanying drawings.

DETAILED DESCRIPTION OF THE PREFERRED EMBODIMENTS OF THE INVENTION

Embodiment 1

Figure 1:
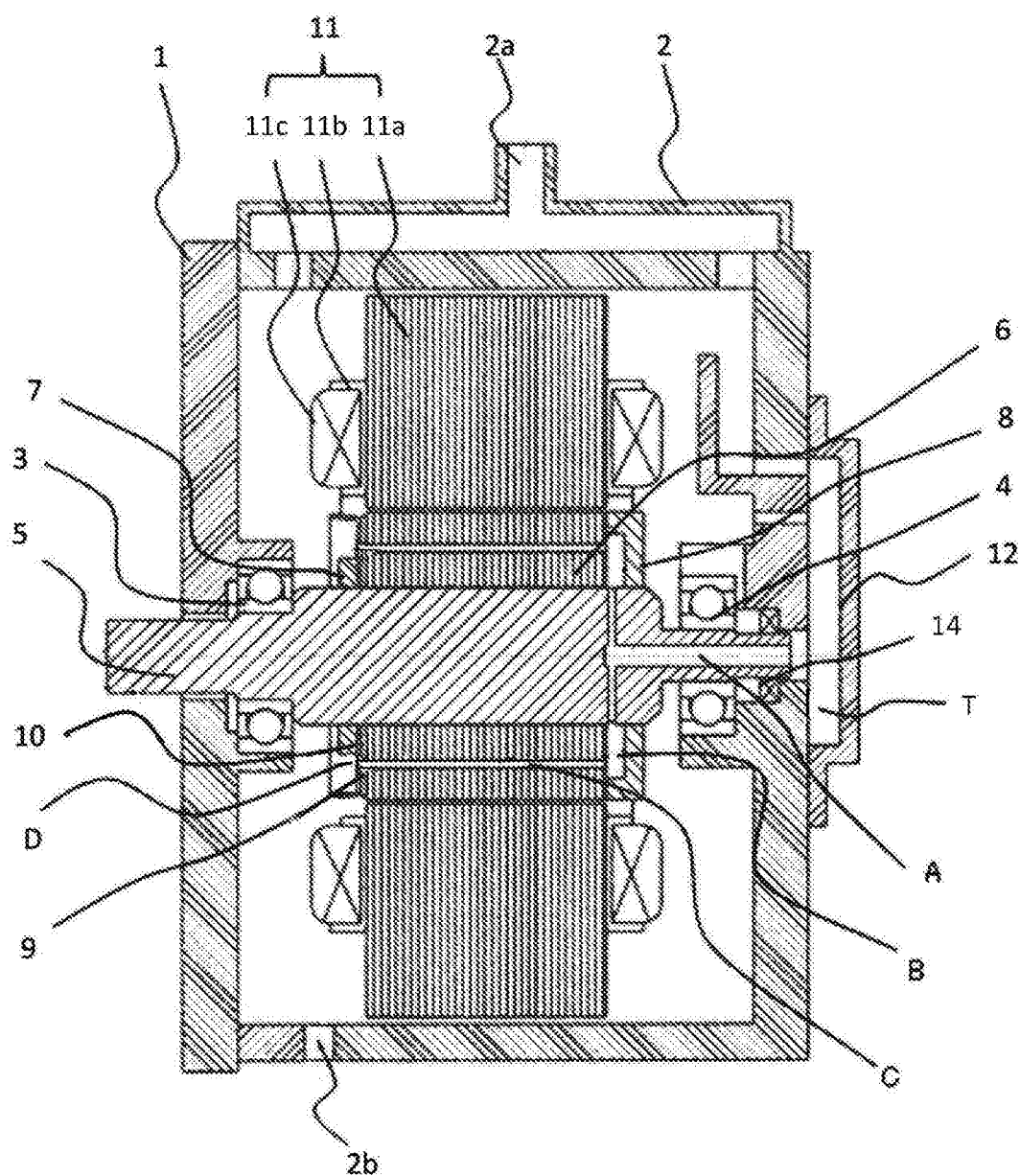
FIG. 1 is a cross-sectional view showing a rotating electric machine according to Embodiment 1 of the present invention.
Figure 2:
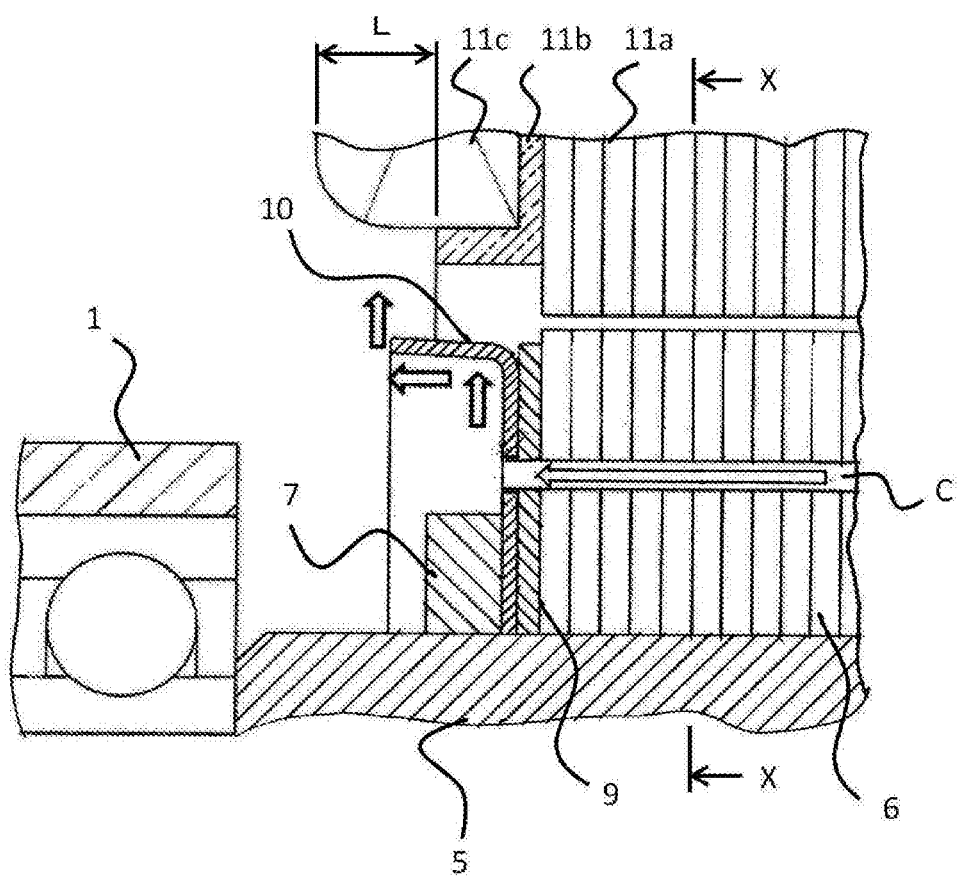
FIG. 2 is an enlarged cross-sectional view showing a main part in FIG. 1.
Figure 3:
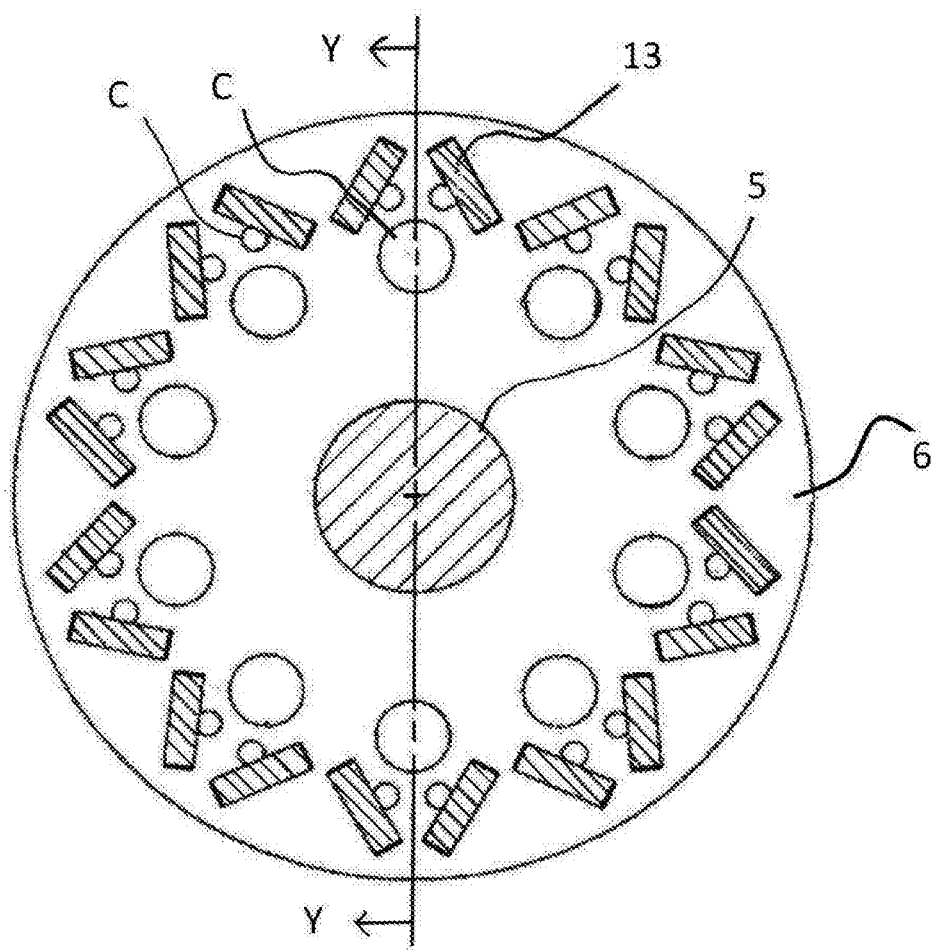
FIG. 3 is a cross-sectional view taken along a line X-X in FIG. 2, showing a rotor portion shape of the rotating electric machine.

FIG. 1 is a cross-sectional view showing the structure of a rotating electric machine according to Embodiment 1 of the present invention, FIG. 2 is an enlarged cross-sectional view showing a main part in FIG. 1, and FIG. 3 is a cross-sectional view taken along a line X-X in FIG. 2, showing a rotor portion shape of the rotating electric machine. FIG. 1 shows a cross-section taken along a line Y-Y in FIG. 3.

As shown in FIG. 1, the rotating electric machine includes: a front bracket 1 and a tubular rear bracket 2 that form a housing; a shaft 5 that is rotatably mounted on these brackets 1 and 2 via bearings 3 and 4; a rotor core 6 that is fixed to the shaft 5 and composed of laminated plates forming a rotor; a front-side end plate 7 and a rear-side end plate 8 that are mounted at both ends of the rotor core 6, respectively; an end plate 9 for preventing scattering of magnets and a bowl-shaped end plate 10 that are provided between the rotor core 6 and the front-side end plate 7; and a stator 11 that is retained on the inner peripheral surface of the rear bracket 2 (see FIG. 2, which shows the main part in an enlarged manner).

Here, a liquid refrigerant inflow port 2*a* through which liquid refrigerant such as a cooling oil is supplied into the housing and a liquid refrigerant discharge port 2*b* through which the supplied liquid refrigerant is discharged are provided in the rear bracket 2, and an oil reservoir T for storing the liquid refrigerant is formed by the rear bracket 2 and a cover 12 that covers an end surface of the rear bracket 2. In addition, the shaft 5 has a refrigerant introduction hole A including: a center hole that faces the oil reservoir T and is extended in the axial direction; and a plurality of holes that are extended from the center hole in a direction toward the outer periphery of the shaft 5.

Furthermore, a passage B is formed which includes a plurality of through holes that are formed in the rotor core 6 and the rear-side end plate 8 so as to face the plurality of holes of the refrigerant introduction hole A. Passages C composed of a plurality of through holes as shown in FIG. 3 are provided in the rotor core 6 so as to face the passage B and extend in the axial direction, and holes are provided in the end plate 9 and the end plate 10 so as to communicate with the plurality of passages C, whereby passage exits D for the liquid refrigerant passing through the rotor core 6 are formed.

Meanwhile, the stator 11 is fixed to the rear bracket 2 (or the front bracket 1) so as to face the outer periphery of the rotor core 6. The stator 11 includes a stator core 11*a*, an insulator 11*b* that is mounted on the stator core 11*a*, and a stator coil 11*c* that is wound on the insulator 11*b*.

Here, the bowl-shaped end plate 10 is formed such that the liquid refrigerant reaches a space L between an end surface of the stator coil 11*c* and an end surface of the insulator 11*b*.

A plurality of magnets 13 are buried in the rotor core 6 along the passages C composed of the plurality of through holes as shown in FIG. 3, and the end plate 9 is configured to prevent scattering of the magnets 13.

With such a configuration, when the shaft 5 is rotationally driven, the rotor core 6 rotates, and an interlinkage magnetic flux generated by the magnets 13 generates a current in the stator coil 11*c*. At this time, in order to cool generated heat, the liquid refrigerant such as a cooling oil is fed under pressure from a pump (not shown) through the inflow port 2*a* of the rear bracket 2 into the housing.

After the liquid refrigerant that has been fed under pressure flows in through the inflow port 2*a*, the liquid refrigerant is sprayed from an upper portion of the rear bracket 2 into the atmospheric pressure in the housing, and also flows to the oil reservoir T, which is formed by the rear bracket 2 and the cover 12. The oil reservoir T is sealed by a seal member 14 that is mounted on the rear bracket 2. Thus, the liquid refrigerant that has flowed into the oil reservoir T enters the refrigerant introduction hole A of the shaft 5 that communicates with the oil reservoir T, and flows from the center of the shaft 5 to the outer periphery of the shaft 5. Then, the liquid refrigerant flows in the radial direction through the passage B, which is formed by the shaft 5, the rotor core 6, and the rear-side end plate 8, further flows through the passages C, which penetrate the rotor core 6 in the axial direction of the rotor core 6, and is discharged from the holes that are provided in the end plate 9 and the end plate 10 as the passage exits D.

Thereafter, as shown by arrows in FIG. 2, the liquid refrigerant flows along the inner peripheral surface of the bowl-shaped end plate 10, and is scattered to the outer peripheral side with rotation of the end plate 10. At this time, since the bowl-shaped end plate 10 is formed so as to project in the axial direction beyond the insulator 11*b*, the liquid refrigerant is scattered to the coil end outer peripheral surface of the stator coil 11*c* and the end surface of the insulator 11*b* without directly colliding with the outer peripheral surface of the insulator 11*b*. Thereafter, the liquid refrigerant flows out of the housing through the discharge port 2*b*.

A guide passage may be formed such that the liquid refrigerant supplied from the pump is fed under pressure to the refrigerant introduction hole A of the shaft 5.

With the above configuration, the liquid refrigerant can be caused to directly collide with the coil end of the stator coil 11*c*, so that the cooling effect can be enhanced. In addition, the liquid refrigerant can be scattered to the coil end without needing to provide an opening in the insulator 11*b*. Thus, a decrease in the strength of the insulator 11*b* can be prevented, and the reliability can be improved. Furthermore, a wide winding space for the stator coil 11*c* can be obtained, so that the motor performance can be enhanced. Moreover, by locating the passages C at the outer peripheral side of the rotor core 6 that is away from the shaft 5, rotation energy for scattering the liquid refrigerant from the rotor can be made greater as compared to the case where the passages C are located at the central side of the shaft 5.

Therefore, even when the rotation rate of the rotor is low, the liquid refrigerant can be caused to reach the coil end, so that the cooling efficiency can be improved in a range from low rotation to high rotation.

The passages C may penetrate any portions of the rotor core 6. When the passages C are caused to penetrate the rotor core 6 so as to be in contact with the magnets 13 as shown in FIG. 3, the magnets 13 can also be cooled efficiently. In addition, when the liquid refrigerant leaks from the passage C through the gap between the rotor core 6 and the end plate 9, the liquid refrigerant flows on the rotor wall surface. By providing the passages C at the outer periphery surface side of the rotor core 6, the distance by which the liquid refrigerant flows on the rotor wall surface can be reduced, resulting in less energy loss caused due to viscosity. Furthermore, the liquid refrigerant that has leaked from the passage C through the gap between the rotor core 6 and the end plate 9 and through the gap between the end plate 9 and the bowl-shaped end plate 10 splashes off the outer peripheral surface of the bowl-shaped end plate 10 and the stator coil 11*c* and thus can be expected to exert an effect of cooling the stator coil 11*c*.

Figure 4:
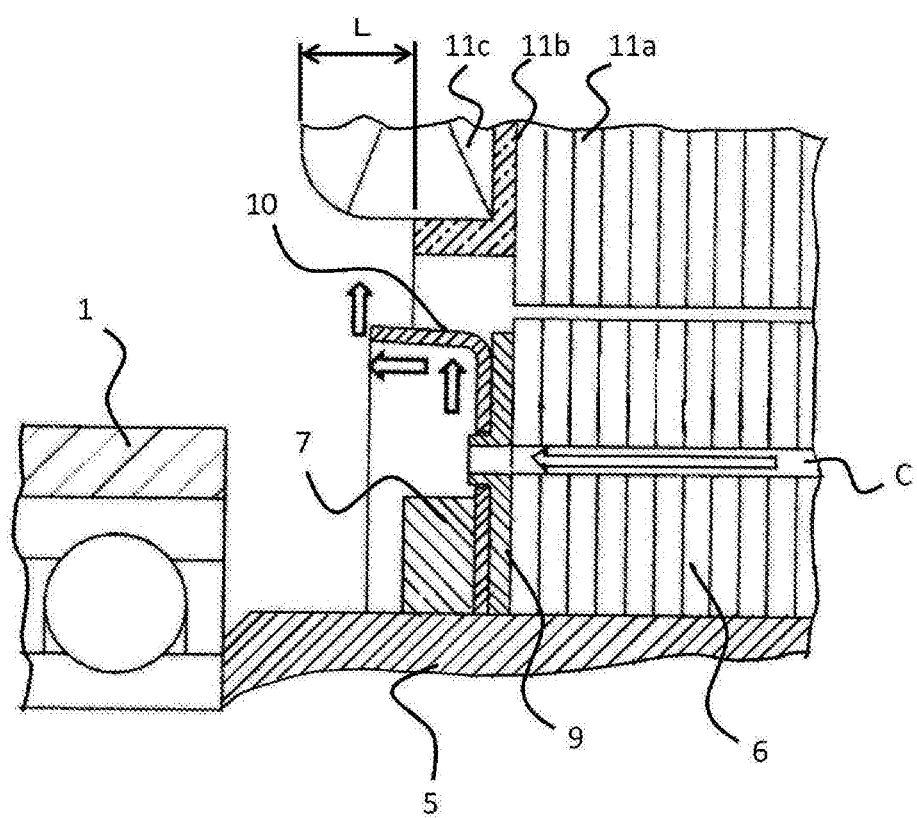
FIG. 4 is a cross-sectional view showing a rotating electric machine according to Embodiment 2 of the present invention.

FIG. 4 is a cross-sectional view showing a rotating electric machine according to Embodiment 2 of the present invention.

As shown in FIG. 4, a projection is formed by burring or the like at the passage exit D side of the end plate 9 that prevents magnet scattering from the rotor core 6, such that the distal end of the projection is located at a position projecting from the hole of the bowl-shaped end plate 10. The other configuration is the same as the configuration of the rotating electric machine according to Embodiment 1, and thus the description thereof is omitted.

Such a configuration of Embodiment 2 can eliminate a drawback that, in the case where contact surfaces of the end plate 9 and the bowl-shaped end plate 10 warpage during manufacture such as press-forming such that the flatness thereof cannot be maintained, the liquid refrigerant leaks through the gap between the contact surfaces. In addition, since the projection is formed by burring or the like, warpage of the end plate 9 can be permitted.

By forming the bowl-shaped end plate 10 such that the contact surface thereof in contact with the end plate 9 and a wall surface thereof extending in the axial direction form an obtuse angle, the oil can be prevented from being continuously accumulated on the inner wall of the bowl-shaped end plate 10. That is, the force applied to the bowl-shaped end plate 10 as a centrifugal force by the liquid refrigerant can be reduced, so that the bowl-shaped end plate 10 can be advantageous in terms of strength. In addition, by forming the inner side of the bowl-shaped end plate 10 with a structure configured by only a flat surface without recesses and projections such as a reinforcing rib, the need to increase a centrifugal force for scattering the liquid refrigerant that is accumulated at recesses and projections of the bowl-shaped end plate 10 is eliminated, so that the need to increase the strength of the bowl-shaped end plate 10 can be eliminated. Therefore, the bowl-shaped end plate 10 can be thin, lightweight, and have a simple shape.

Additionally, the liquid refrigerant that has leaked from the passage C through the gap between the rotor core 6 and the end plate 9 splashes off the outer peripheral surface of the bowl-shaped end plate 10 to the inner peripheral side of the stator coil 11c and thus can be expected to enhance the cooling effect.

Figure 5:
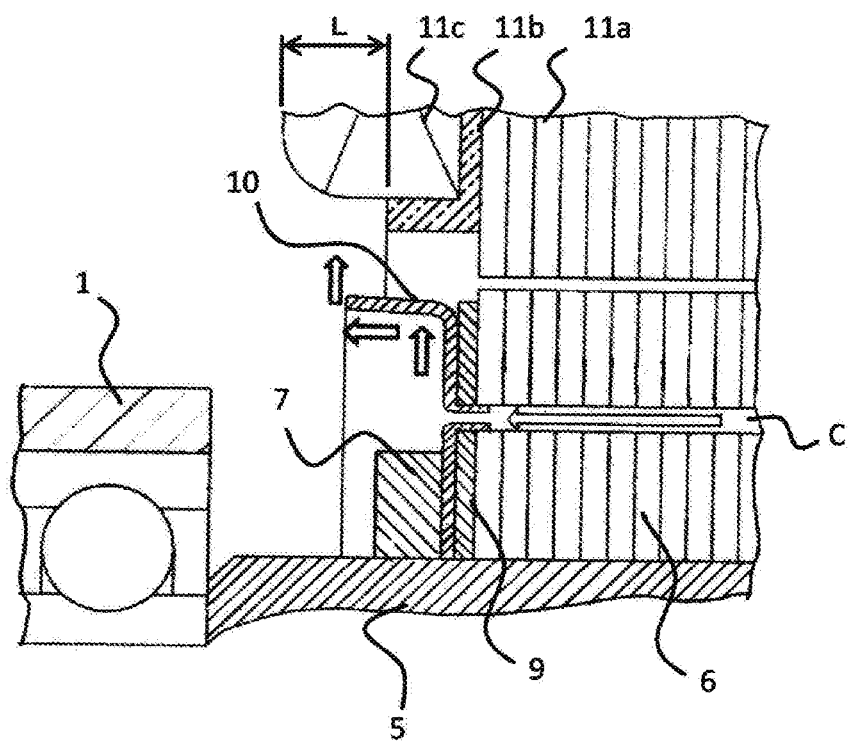
FIG. 5 is a cross-sectional view showing a rotating electric machine according to Embodiment 3 of the present invention.

FIG. 5 is a cross-sectional view showing a rotating electric machine according to Embodiment 3 of the present invention.

Whereas the projection is provided on the end plate 9 in Embodiment 2 described above, a projection is provided on the bowl-shaped end plate 10 by burring or the like so as to project to the inner peripheral side of the passage C of the rotor core 6 in Embodiment 3. Such a configuration can eliminate a drawback that the liquid refrigerant leaks through the gap between the rotor core 6 and the end plate 9 and the gap between the contact surfaces of the end plate 9 and the bowl-shaped end plate 10.

Figure 6:
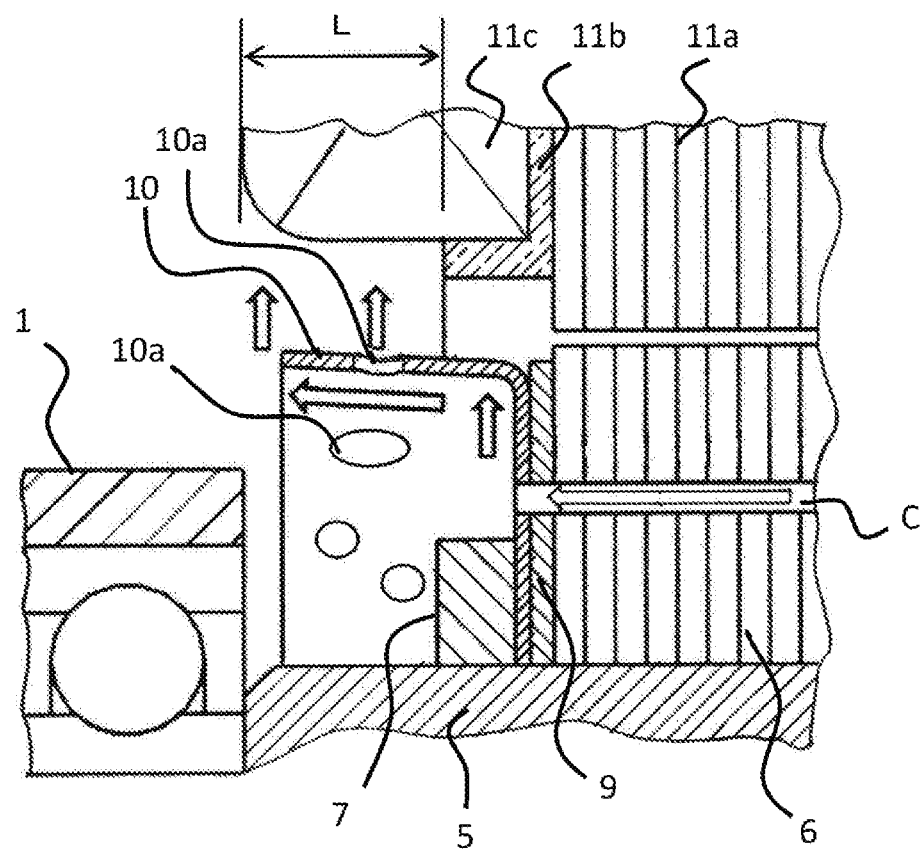
FIG. 6 is a cross-sectional view showing a rotating electric machine according to Embodiment 4 of the present invention.

FIG. 6 is a cross-sectional view showing a rotating electric machine according to Embodiment 4 of the present invention.

As shown in FIG. 6, one or more openings 10a are formed in the wall surface, of the bowl-shaped end plate 10, extending in the axial direction. The other configuration is the same as the configuration of the rotating electric machine according to Embodiment 1, and thus the description thereof is omitted.

With such a configuration, even in the case with a stator having a long coil end length as in distributed winding, the liquid refrigerant can be efficiently scattered to the coil end of the stator coil 11c, so that the cooling efficiency can be enhanced.

In the above-described embodiments, when imbalance of rotation occurs in the rotor, the imbalance of the rotor can be eliminated by machining the end plate 7, which fixes the bowl-shaped end plate 10, so as to attain a proper balance. Thus, the need to impart a material thickness for balance adjustment to the bowl-shaped end plate 10 is eliminated, so that the bowl-shaped end plate 10 can be thin, lightweight, and have a simple shape.

In addition, by forming the bowl-shaped end plate 10 from a non-magnetic material, magnetic flux leak can be prevented. As a result, the performance of the rotating electric machine can be prevented from diminishing.

Furthermore, since the front-side end plate 7 that is formed from a magnetic material is fixed to the shaft 5 that is formed from a magnetic material, so as to interpose the bowl-shaped end plate 10 and the end plate 9, a structure for fixing the bowl-shaped end plate 10 can be simplified. In the case of subjecting the front-side end plate 7 to removal machining for imbalance adjustment, the amount of removal can be made large and the machining can be easy, since the specific gravity of the front-side end plate 7 is high.

By interposing an adhesive between the end plate 9, which prevents scattering of the magnets, and the bowl-shaped end plate 10 and/or between the end plate 9 and the rotor core 6 to bond these components, a drawback that the liquid refrigerant leaks through the gap between the contact surfaces of these components to the stator 11 side can be prevented. In addition, by combining this configuration with the projection that is shown in Embodiment 2 (FIG. 4) or Embodiment 3 (FIG. 5) and is formed by burring, the drawback of leak of the liquid refrigerant can be further assuredly prevented.

By forming, as a flat surface, a distal end surface of the wall surface, of the bowl-shaped end plate 10, extending in the axial direction, the wall surface is not widened by a centrifugal force and does not become disadvantageous in terms of strength, as compared to the case where there is a slit in the end surface.

The inflow port 2a and the discharge port 2b for the liquid refrigerant are provided in the rear bracket 2 in the above-described embodiments, but may be provided in the front bracket 1, which forms the housing.

Each of the above embodiments may be modified or omitted as appropriate within the scope of the present invention.

Various modifications and alterations of this invention will be apparent to those skilled in the art without departing from the scope and spirit of this invention, and it should be understood that this is not limited to the illustrative embodiments set forth herein.

What is claimed is:

1. A rotating electric machine comprising:
   a housing;
   a rotor including a shaft rotatably supported within the housing, a rotor core in which a magnet is buried and which is fixed to the shaft, a front-side end plate and a rear-side end plate mounted at both ends of the rotor core, respectively, an end plate provided between the rotor core and the front-side end plate for preventing scattering of the magnet, and an end plate formed in a bowl shape; and
   a stator retained on an inner peripheral surface of the housing so as to face the rotor, wherein
   a passage including a hole penetrating the rotor core and a hole connecting the shaft to the end plate and the bowl-shaped end plate is provided, liquid refrigerant is supplied through the passage, and the bowl-shaped end plate is configured such that the liquid refrigerant discharged from the passage is scattered by rotation along an inner peripheral surface of the bowl-shaped end plate and expelled from an outermost axial end of the bowl-shaped end plate so as to reach a space between a coil end surface of the stator and an end surface of an insulator supporting a coil of the stator.

2. The rotating electric machine according to claim 1, wherein a projection is formed so as to project at a passage exit side of the end plate for preventing scattering the magnet such that the projection extends to a position projecting from a hole of the bowl-shaped end plate.

3. The rotating electric machine according to claim 1, wherein a projection is formed on the bowl-shaped end plate so as to project at an inner peripheral side of the passage of the rotor core.

4. The rotating electric machine according to claim 1, wherein the bowl-shaped end plate is formed such that a contact surface thereof in contact with the end plate for preventing scattering of the magnet and a wall surface thereof extending in an axial direction form an obtuse angle.

5. The rotating electric machine according to claim 1, wherein one or more openings in a radial direction are formed in the bowl-shaped end plate at a position projecting from an axial end surface of the insulator.

6. The rotating electric machine according to claim 1, wherein the bowl-shaped end plate is formed from a non-magnetic material.

7. The rotating electric machine according to claim 1, wherein the front-side end plate fixing the bowl-shaped end plate to the shaft is formed from a magnetic material.

8. The rotating electric machine according to claim 1, wherein an inner peripheral side of the bowl-shaped end plate is formed as a flat surface.

9. The rotating electric machine according to claim 1, wherein an end surface of a wall surface, of the bowl-shaped end plate, extending in an axial direction is formed as a flat surface.

10. The rotating electric machine according to claim 1, wherein the end plate for preventing scattering of the magnet and the bowl-shaped end plate are bonded to each other, and/or the end plate for preventing scattering of the magnet and the rotor core are bonded to each other.

* * * * *